Dec. 3, 1963 A. J. POWERS, JR., ETAL 3,112,683

FILM SIGNALING MEANS

Filed April 2, 1959 2 Sheets-Sheet 1

INVENTORS
AUGUSTIN J. POWERS, JR.
ANDREW K. ANANDER
BY Morgan, Finnegan, Durham & Pine
ATTORNEYS Dec. 3, 1963 A. J. POWERS, JR., ETAL 3,112,683

FILM SIGNALING MEANS

Filed April 2, 1959 2 Sheets-Sheet 2

INVENTORS
AUGUSTIN J. POWERS, JR.
ANDREW K. ANANDER
BY Morgan, Finnegan, Durham & Pine
ATTORNEYS.

United States Patent Office
3,112,683
Patented Dec. 3, 1963

1

3,112,683
FILM SIGNALING MEANS
Augustin J. Powers, Jr., Glen Head, and Andrew K. Anander, Glen Cove, N.Y., assignors to Powers Chemco, Inc., Glen Cove, N.Y., a corporation of New York
Filed Apr. 2, 1959, Ser. No. 803,604
5 Claims. (Cl. 95—31)

The invention relates to a film signaling device for roll-film cameras and more particularly to a device for signaling film delivery from the roll.

It is customary practice in large professional cameras to utilize film mounted on rolls and means are provided in the camera for severing and delivering a sheet of film from the roll to the pressboard at the focal plane of the camera. In the usual embodiment, film is fed from a roll passing it between two feed rolls from whence it is guided downwardly to the pressboard of the camera. In practice, difficulty has been encountered in that the photographer has no way of knowing whether film is actually being delivered from the roll. Occasionally, the photographer, after composing the subject and making his exposure, finds to his chagrin that there was no film in position and the photograph has to be taken again.

Accordingly, the invention has for its object the provision of a signal to inform the photographer whenever film is being delivered from the roll and more particularly to provide preferably a visual signal and one which may conveniently be rendered inoperative upon the changing of film rolls or upon the replenishing of film.

Briefly, and in general, the present invention comprises a shaft which is rotated whenever film is delivered from the film roll in conjunction with means for translating this rotation movement into a signal. Signal means are provided on the camera and are adapted to be intermittently engaged and actuated upon rotation of the shaft. In a form of the invention a non-circular cam is rotated by the shaft and through a resilient actuator causes a switch to periodically close and energize the signal means.

It will be understood that the foregoing general description and the following detailed description as well are exemplary and explanatory of the invention but are not restrictive thereof.

Figure 1:
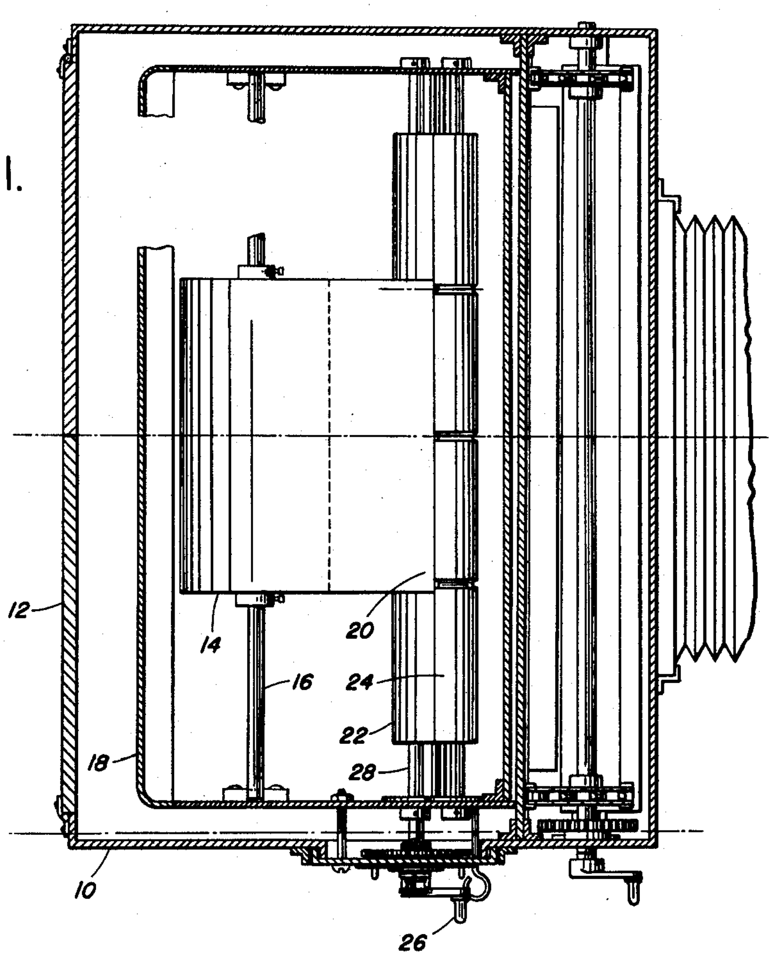
Figure 2:
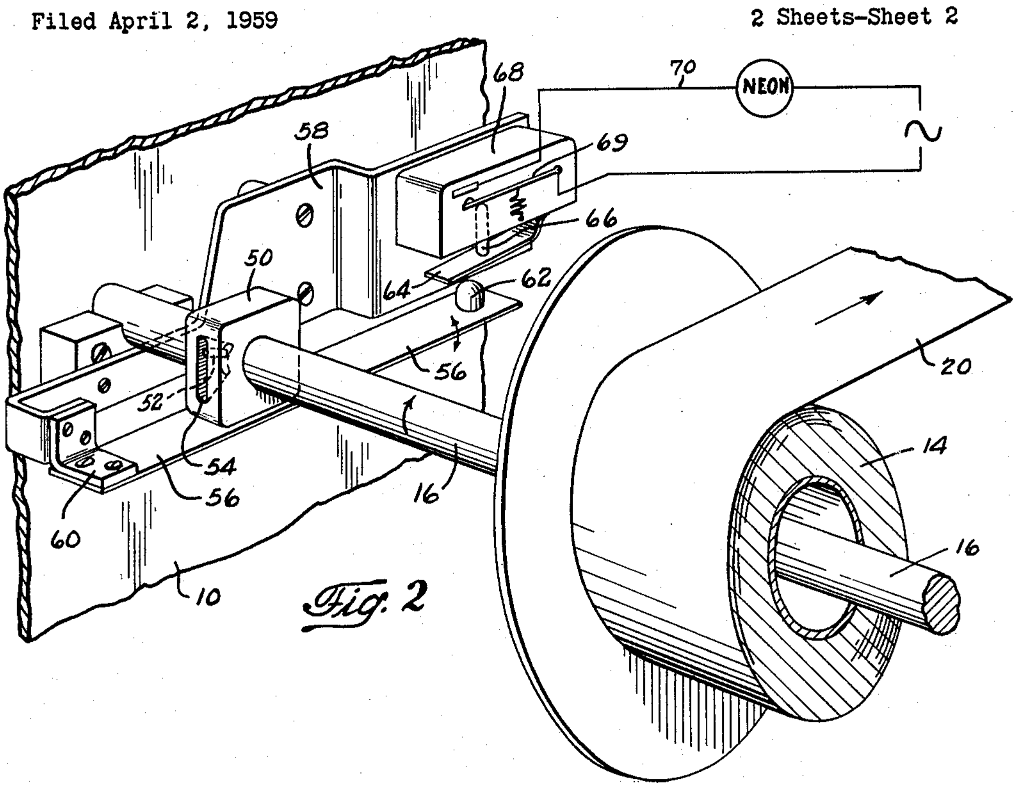

Of the drawings:

FIG. 1 is a transverse sectional view through the rear portion of a camera embodying the present invention; and FIG. 2 is a detailed perspective view, partly in section, of the invention.

Turning now to the drawings, there is shown a camera of the type described in United States Patent 1,909,424 of May 16, 1933, to F. T. Powers equipped with a preferred embodiment of the present invention. The rear portion of such a camera is shown in FIG. 1 with the outer casing 10 having a hinged door 12 through which access may be had to a film roll 14 mounted on a rotary shaft 16 within the casing 18 of a supply mechanism. The leading end 20 of the film roll 14 is inserted between rollers 22, 24 from whence it is directed downwardly to the pressboard of the camera (not shown). Rotation of the rollers 22, 24 is effected by means of a crank handle 26 mounted on the outside of the camera casing 10 and secured to the shaft 28 of the drive roller 22.

FIG. 2 illustrates in detail the form of the invention. There the shaft 16 for the film roll has loosely mounted thereon a cam-like member 50 substantially in the form of a square block. Intermittent rotation of the block 50 with the shaft 16 is effected by means of a pin 52 set into the shaft 16 which resides within a recess 54 formed within one side of the block 50.

Immediately below the block 50 there is a flat spring-like member 56 secured to a brace 58 at one end by the

2 bracket 60 and having, at its opposite end, a projection or hammer 62. The projection 62 is normally spaced slightly from resilient finger 64 as shown in FIG. 2 and this finger, in turn, is in contact with a plunger 66 in a switch 68 mounted on the brace 58 so as to control the signal circuit 70. The contacts of switch 68 which include resilient arm 69 are biased so the switch is normally open and as shaft 16 is rotated (in the clockwise direction as shown in FIG. 2) by pin 52 in slot 54, resilient member 56 is deflected downward from its normal or rest position shown in FIG. 2. After passage of the high spot or corner of cam 50, the resilient member 56 forces the cam 50 ahead to the next flat position and the inertia of the weighted projection or hammer 62 causes resilient member 56 to travel beyond its rest position on its return from its deflected position so that the hammer 62 strikes finger 64 and thereby momentarily moving the contacts of switch 68 to the closed position, through plunger 66, causing the light to flash. The block 50 then remains at rest until the pin 52 again contacts the leading edge of the recess 54 and rotates the block another quarter of a revolution. The signal means is then intermittently actuated to turn on a light informing the operator that the film is being fed off the roll.

The invention in its broader aspects is not limited to the specific mechanisms shown and described but departures may be made therefrom within the scope of the accompanying claims without departing from the principles of the invention and without sacrificing its chief advantages.

What is claimed is:

1. In a roll film camera the combination comprising a shaft supporting a roll of film in the camera as the supply therefor, means mounting said shaft in said camera for rotation upon delivery of said film from the roll, a block having angularly disposed sides forming a plurality of spaced peripheral corners thereon, means securing said block on said shaft for rotation therewith, signal means on said camera, an elongated resilient element, means mounting one end of said element to said camera with a portion adjacent the middle thereof in contact with said block, an actuating switch for said signalling means positioned adjacent the free end of said resilient member, feed means for unrolling said film, the corners of said block successively intermittently engaging said elongated member in response to said film unrolling to effect displacement of the free end of said member away from said switch, the free end of said elongated member actuating said switch upon release of said elongated member by one of the corners.

2. The invention as defined in claim 1, wherein said block securing means includes means loosely mounting said block on said shaft, a pin carried by said shaft and adapted to be received in a recess formed in said block whereby rotation of said shaft effects rotation of said block through said pin, said pin and recess enabling said block to rotate in advance of the rotation of said shaft.

3. The invention as defined in claim 1, wherein said signal means comprises an operating circuit including said actuating switch, and light means in said circuit adapted to be actuated upon actuation of said switch.

4. In a roll film camera the combination comprising a shaft supporting a roll of film in the camera as the supply therefor, means mounting said shaft in said camera for rotation upon delivery of said film from the roll, a block having angularly disposed sides forming a plurality of spaced peripheral corners thereon, means loosely mounting said block on said shaft, means on said shaft for effecting rotation of said block with said shaft, including lost-motion means between said block and said shaft for enabling said block to rotate in advance of the rotation of said shaft, means securing said block on said shaft for rotation therewith, signal means on said camera, an elongated resilient element, means mounting one end of said element to said camera with a portion adjacent the middle thereof in contact with said block, an actuating switch for said signaling means positioned adjacent the free end of said resilient member, feed means for unrolling said film and rotating said shaft, the corners of said block successively intermittently engaging said elongated member in response to said film unrolling to effect displacement of the free end of said member away from said switch, the release of said elongated member by one of said corners effecting actuation of said switch by the free end of said member while advancing the position of said block on said shaft until the next rotation thereof by said shaft.

5. The invention as defined in claim 4, wherein said block is substantially square and wherein said block is adapted to actuate said switch upon each quarter of a revolution of said block by said shaft.

References Cited in the file of this patent

UNITED STATES PATENTS

| | | |
|---|---|---|
| 666,556 | Prentice | Jan. 22, 1901 |
| 1,217,444 | Hardy | Feb. 27, 1917 |
| 1,963,095 | Petit et al. | June 19, 1934 |
| 2,143,550 | Gilbert | Jan. 10, 1939 |
| 2,175,938 | Fry | Oct. 10, 1939 |
| 2,441,185 | Brown et al. | May 11, 1948 |
| 2,457,075 | Williams | Dec. 21, 1948 |
| 2,798,126 | Burge | July 2, 1957 |
| 2,834,140 | Knier | May 13, 1958 |
| 2,871,327 | Jones | Jan. 27, 1959 |